United States Patent [19]
Giles et al.

[11] Patent Number: 5,548,394
[45] Date of Patent: Aug. 20, 1996

[54] SCANNING FINGERPRINT READING

[75] Inventors: Richard M. Giles; Daniel J. Driscoll, both of Laguna Niguel; Eliseo Ranalli, Irvine, all of Calif.; John M. Tamkin, Tucson, Ariz.; Bradley Scott, Fountain Valley, Calif.

[73] Assignee: Printrak International Inc., Anaheim, Calif.

[21] Appl. No.: 404,931

[22] Filed: Mar. 16, 1995

[51] Int. Cl.$^6$ ................................................. G06K 9/20
[52] U.S. Cl. ................................................. 356/71
[58] Field of Search .............................. 356/71; 382/124, 382/125, 126, 127

[56] References Cited

U.S. PATENT DOCUMENTS

| | | | |
|---|---|---|---|
| 3,748,015 | 7/1973 | Offner | 350/55 |
| 4,151,512 | 4/1979 | Riganati et al. | 340/146.3 |
| 4,428,676 | 1/1984 | Chastang et al. | 356/354 |
| 4,537,484 | 8/1985 | Fowler et al. | 354/62 |
| 4,553,844 | 11/1985 | Nakagawa et al. | 356/376 |
| 4,568,178 | 2/1986 | Rios | 355/40 |
| 4,652,116 | 3/1987 | Rios | 355/40 |
| 4,681,435 | 7/1987 | Kubota et al. | 356/71 |
| 4,690,554 | 9/1987 | Froelich | 356/71 |
| 4,784,484 | 11/1988 | Jenson | 356/71 |
| 4,925,300 | 5/1990 | Rachlin | 356/71 |
| 4,946,276 | 8/1990 | Chilcott | 356/71 |
| 5,109,427 | 4/1992 | Yang | 382/4 |
| 5,230,025 | 7/1993 | Fishbine et al. | 382/4 |
| 5,233,404 | 8/1993 | Lougheed et al. | 356/71 |
| 5,416,573 | 5/1995 | Sartor | 356/71 |

OTHER PUBLICATIONS

Chapter 12 entitled "Image Formation and Light Throughput", *Optics*, by K. D. Moller, University Science Books, 1988.
W. Wetherell, *Applied Optics and Optical Engineering*, vol. X, editor Shannon & Wyant, Academic Press 1987, pp. 177–180.

*Primary Examiner*—Richard A. Rosenberger
*Attorney, Agent, or Firm*—Poms, Smith, Lande & Rose

[57] ABSTRACT

A scanning fingerprint reader provides a set of digital data representing interface topology of a fingerprint pressed against a platen (20). The platen (20) is formed by one surface of a prism (10) utilizing total internal reflection of an illuminating beam (30) directed at an interior surface of the prism. The beam (37) that is output from the prism is fed through a scanning lens (40) to a scanning mirror (48) that causes the fingerprint image (68) to scan across a linear array (60) of CCD sensors that is repetitively sampled to provide a print readout of the entire surface of the prism for reading a slap print. The signal from the CCD array is read out and digitized (72,74,76) to provide a serial bit stream (78) representing the set of multiple fingerprints on the platen. An optical architecture (40,48,56) employing dual telecentricity eliminates keystoning distortion. A portion of the beam is sent to a linear CCD array (94) of a roll print camera to provide an estimate of the position of the line of contact of the finger during its rolling motion over the platen. The estimate is used (52) to position the scan mirror (48) so that the image of the line of contact (98) of the rolling finger (100) is aligned with the linear array (70) of the print camera.

25 Claims, 3 Drawing Sheets

SCANNING FINGERPRINT READING

BACKGROUND OF THE INVENTION

1. Field of the Invention

The present invention relates to the reading of fingerprints, and more particularly concerns methods and apparatus for viewing a finger and providing a body of output data that accurately and precisely defines a fingerprint.

2. Description of Related Art

Fingerprint identification is becoming increasingly automated, and as advantages of automatic fingerprint identification systems become more apparent through widespread use, automated fingerprint identification systems are becoming more common and more widely used. Many of such automated fingerprint identification systems input an electronic representation of an unknown fingerprint for use in selection of one or more matching prints from a massive body of stored electronic representations of many fingerprints. Yet, despite the extent and sophistication of automated fingerprint matching, fingerprints still are captured and recorded by old and conventional procedures utilizing ink, ink pad, and roller to provide an inked impression which is scanned to form a digital electronic representation for storage or comparison. These conventional procedures are inconvenient, slow, and, in many cases, inefficient. They frequently fail to record adequate definition of certain details, singularities and minutiae that are employed in fingerprint identification and matching processes.

Various types of optical systems have been suggested for automatically capturing and recording a print without use of card and ink, but these systems fail to provide a print record that will meet established criteria, such as specifications established by the Federal Bureau of Investigation. These criteria must be met for efficient and effective input to the automated print identification and matching equipment. Prior optical reading systems produce output images that are unacceptably distorted and lacking in satisfactory definition and resolution.

Certain of the specifications of the Federal Bureau of Investigation, for example, require a fingerprint image that is free of distortion and is defined by five hundred pixels per inch in both horizontal and vertical directions. Previously known optical fingerprint imaging apparatus, such as the fingerprint imaging apparatus of U.S. Pat. No. 4,537,484, to Fowler, et al., the recognition system of U.S. Pat. No. 5,109,427, to Yang, the optical fingerprint imaging device of Rachlin, shown in U.S. Pat. No. 4,925,300, or the copying systems of U.S. Pat. No. 4,568,178 to Rios, fail to provide fingerprint images that meet established criteria.

Accordingly, it is an object of the present invention to provide for optical reading of a fingerprint by methods and apparatus that minimize or avoid problems of the prior art.

SUMMARY OF THE INVENTION

In carrying out principles of the present invention in accordance with a preferred embodiment thereof, a fingerprint reader includes an imaging system that produces an optical image of a fingerprint, a scanning mirror, a linear array of sensors, and a feedback control system for coordinating the capture of the fingerprint image by the sensor array with the relative motion of a rolling finger, via dynamic positioning of the scan mirror. Because the object plane is tilted, the image plane is also tilted so as to keep the image in sharp focus. Resultant keystone distortion is eliminated by an optical system that is telecentric in both object space and image space. A scanning mirror employed to scan the optical image across the linear array of sensors is interposed between a scan lens and a focus lens having a common focal point at which the mirror is positioned. For reading out a roll print there is generated a finger position signal indicative of position of a finger in the object plane, and a controller is provided to control the angular position of the scan mirror in response to the indicated finger position.

According to a feature of the invention, the optical system has an anamorphic magnification, and the scan rate of the scan mirror is controlled to compensate for the anamorphic magnification, and to make the effective magnification of the system equal in two mutually orthogonal directions.

DESCRIPTION OF PREFERRED EMBODIMENTS

Figure 1:
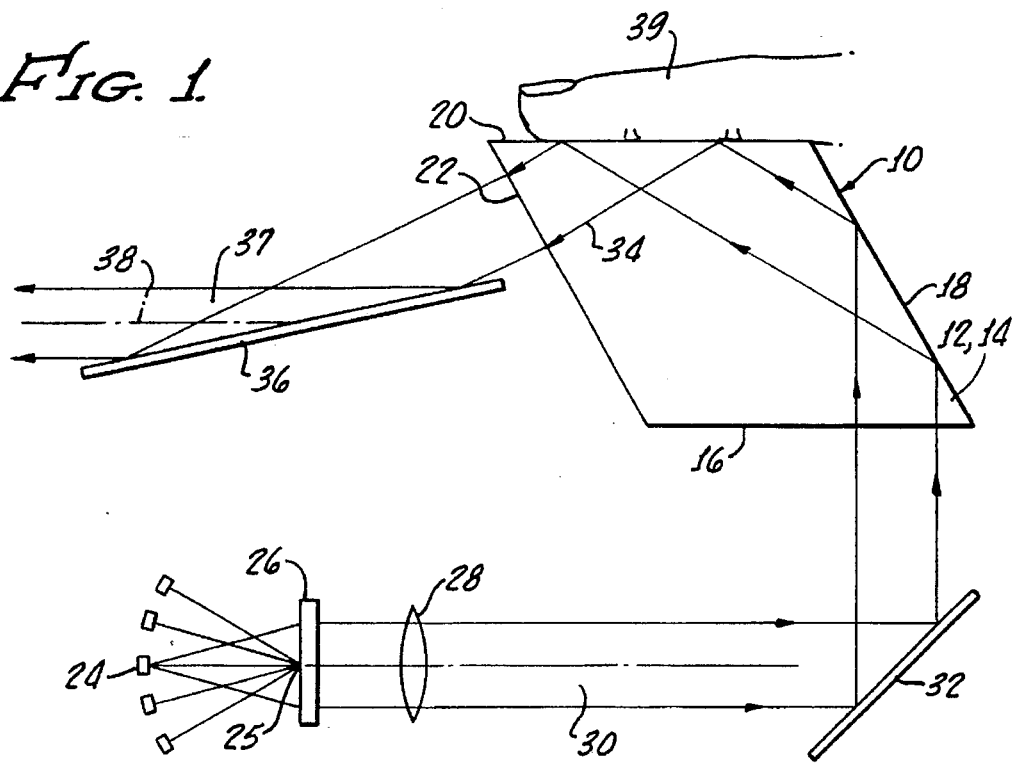
FIG. 1 illustrates an imaging prism and an illumination system therefor that form a total internal reflection imaging arrangement for a fingerprint reader embodying principles of the present invention.

As indicated in FIG. 1, the system of the present apparatus is based upon total internal reflection from a prism that forms a platen against which a finger or a group of fingers are pressed for the reading of fingerprints. The system provides an electrical output that is an accurate representation of a fingerprint of one or more fingers pressed against the platen. A rhomboidal prism 10 has parallel end faces 12 and 14, an input face 16, a reflective face 18, a platen face 20 parallel to input face 16, and an output face 22 parallel to reflective face 18. In an exemplary embodiment the prism is a 60° or 65° BK-7 glass prism. For better discrimination against moisture in the total internal reflection system, the angle between sides 16 and 18 and 20 and 22 is preferably 65°. The several surfaces of the prism are rectangular, with the platen or uppermost face 20 having a dimension in the order of 2 by 3¼ inches, for example. Where the prism is formed of a BK-7 glass, it has a critical angle of 41.315° when the medium at the exterior of the prism is air, and a critical angle of 61.65° when the external medium is water. However, when the external medium is skin (with an assumed refractive index of 1.440), the critical angle is 72.0°. Accordingly, there is total internal reflection from the upper face or platen 20 when air or water is in contact with the platen 20, but this internal reflection is defeated by contact with ridges of a finger pressed against the platen 20.

A light source 24, which may comprise a circular array of light emitting diodes (although a linear array may be used), directs the light from all diodes at a common spot 25 on an elliptical beam spreading diffuser 26 which spreads the beam by about five degrees in a vertical direction (as viewed in FIG. 1), and by about 10 degrees in a horizontal direction (perpendicular to the plane of the paper). The diffuser sends a spreading beam through a lens 28 that directs an illumination beam 30 of essentially parallel rays at an input mirror 32 that is positioned at or about 45° to the axis of the beam 30. The illumination light is reflected from input mirror 32 at nearly right angles to the input face 16 of the prism 10. This light is reflected internally within the prism 10 from the reflection surface 18, which is silvered on its exterior face to ensure full reflection, and thence reflected to the internal surface of platen 20. The light impinges on platen 20 at an angle of incidence equal to or greater than the critical angle of the glass/air or glass/water interface (in the absence of a finger pressed against the platen 20). Light totally internally reflected from the internal surface of the platen 20, as indicated by ray 34, passes through the output face 22 for reflection from a fold mirror 36 as a beam 37 along a system optical axis 38. This beam contains optical information which, when focused, provides a reflection map of the glass/skin interface, from which fingerprint ridge definition is derived.

A finger or group of fingers, such as indicated at 39 in FIG. 1, placed on or pressed against the platen 20 of the prism, defines spatially the total internal reflection profile of light rays at the internal face of the platen. As stated above, in the absence of a finger on the surface, the prism/air interface provides a critical angle for total internal reflection as described. Where ridges of the finger are pressed against the platen 20, the total internal reflection of the prism is defeated so that light from those points at which the finger ridges touch the platen is not totally internally reflected but, instead, most of the light passes out of the prism through the face 20, and is absorbed by the finger or fingers. Accordingly, an output light beam 37 passed through the output face 22 of the prism is a pattern of dark (low intensity light) and light (high intensity light), where the dark represents the fingerprint pattern. This is a direct analog of an inked fingerprint.

Optical axis 38 of output light beam 37 is coincident with the optical axis of a multi-element scan lens 40 (FIG. 2) to which the image is directed from the folding mirror 36. Light from the scan lens 40 is directed to a turning mirror 44 and thence through a first beam splitter 46 to a scan mirror 48.

Figure 2:
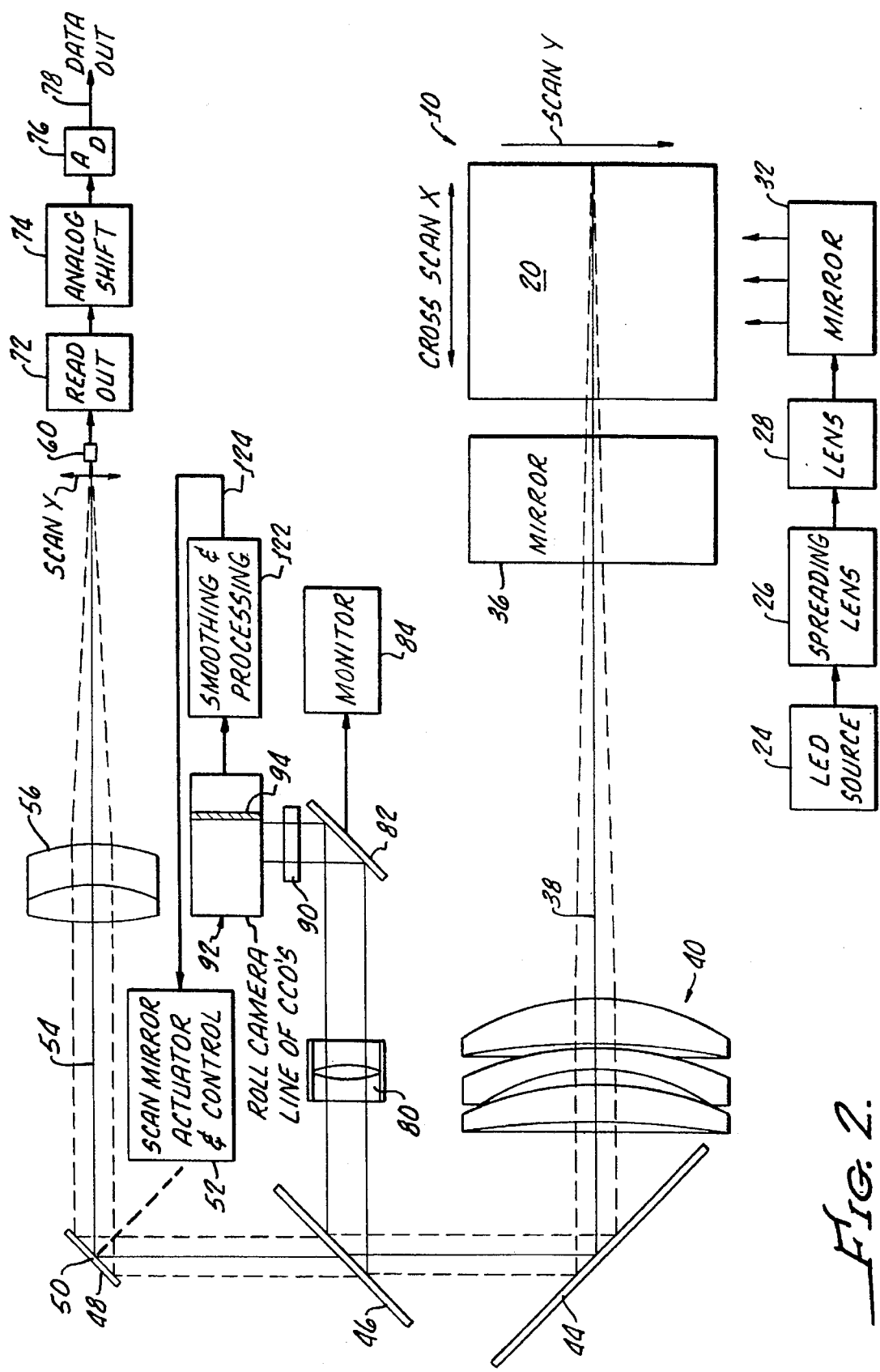
FIG. 2 is a schematic illustration of a fingerprint reading system of the present invention.

The scan mirror is mounted for rotation about an axis 50 lying in the plane of the reflective surface of the mirror and extending perpendicular to the plane of the paper, as viewed in FIG. 2. The mirror position is controlled by a scan mirror actuator and control system 52, which is capable of driving the mirror at a constant rotational speed or to a desired angular position under control of a position input command to the controller 52, as will be more particularly described below.

The image of platen 20 is reflected from the scan mirror along an optical axis 54 to a focusing lens 56 which focuses the image in the plane of a print camera 60. Print camera 60 comprises a fixedly positioned linear array charge coupled device (CCD) whose sensors extend in a direction that may be termed a "cross scan direction", namely a direction perpendicular to the direction of scan produced by the rotation of scan mirror 50.

The print camera 60 is part of the first of three optical paths in this system. The first or print scan path includes the prism 10, lens 40, scan mirror 48, lens 56 and the print camera 60. A second optical path is a live view monitor path to enable live visual monitoring of the print capture process. A third optical path is a roll print tracking path that includes a second linear array CCD for generating a position signal that indicates a centroidal position for a single finger moving across the prism platen. Components of the print scan path have been described above. The live monitor and roll print tracking paths will be described in detail below.

Figure 3:
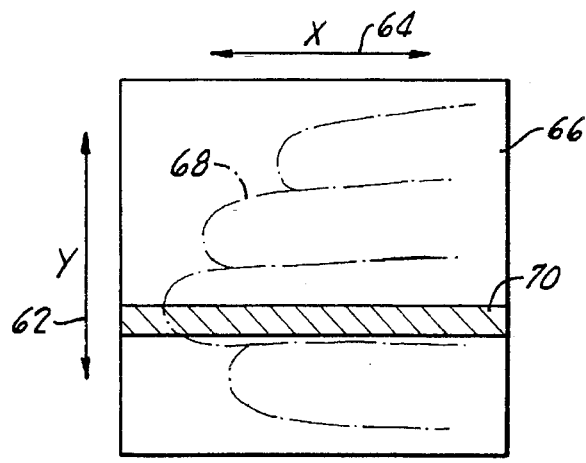
FIG. 3 illustrates the arrangement of a linear array print camera with respect to a fingerprint image.

Referring to the illustration of prism 10 shown in FIG. 2, the drawing shows a top view of the platen 20 and indicates the scan as taking place in the Y direction, as indicated by arrow 62. A cross scan direction, indicated by arrow 64, is perpendicular to the scan direction Y and extends in an X direction from left to right of the drawing as viewed in FIG. 2. A finger or fingers are placed on the platen 20 with their longitudinal extent parallel to the cross scan or X direction (see FIG. 3), and the system is arranged by means including rotation of the scanning mirror to effectively move the image (at the print camera 60) from one side to the other of the platen 20 (vertically as viewed in FIG. 2) in the direction of scan arrow 62. The image of this platen is schematically depicted at 66 in FIG. 3, showing the Y direction arrow 62 and X direction arrow 64. A "slap" print or flat hand print of all four fingers is illustrated in dotted lines at 68 in FIG. 3 to indicate orientation of the fingers relative to the platen image. Also shown in FIG. 3 is a linear array CCD 70 constituting the print camera. This linear array extends in the cross scan or X direction so that as the entire image 66 is caused to scan (by rotation of the scan mirror 50) in the Y direction, the entire image will move across the CCD in the Y direction (vertically as seen in FIG. 3).

Charges stored in all elements or cells or sensors of the print camera 60 are repetitively read out in parallel at a selected readout rate to a circuit 72. Circuit 72 contains an analog voltage storage cell for each of the sensors of the CCD array. Contents of the analog voltage storage cells are fed to an analog shifting circuit 74 that shifts the contents of each analog cell to its adjacent cell and thence out to an analog to digital converter 76 from the output of which, on a line 78, appears a serial bit stream of digital data that defines a digitized version, in two dimensions, of all the pixels of the fingerprint. Preferably, to meet certain specifications established for instruments of this type, the digitized output defines pixels that are positioned adjacent to each other on the platen at five hundred per inch, in both X and Y. Preferably the mirror scan rate causes the full image of platen 20 to traverse the linear array of print camera 60 with a duration on the order of a second (about one full traverse per second). However, this scan rate is adjusted to control effective magnification in the cross scan (X) direction, as will be described below.

The live view monitor path is the second optical path. In order to enable an operator of this reader to monitor the fingerprint imaging process as it occurs, and to determine the nature of the operation and the state and quality of the fingerprints being acquired, a portion of the image light from scan lens 40 is reflected from beam splitter 46 through a positive cylindrical lens 80, through a second beam splitter 82, and thence to a monitoring video camera 84, which may take the form of a two-dimensional CCD that provides an input to a CRT monitor 84. The two-dimensional CCD array and monitor 84 provide a visual display of the object on platen 20 at all times so that an operator can determine if all four fingers are properly placed on the platen or that a single finger is properly rolled across the platen.

Fingerprints are taken in two general types, a full finger scan, often termed a "slap print", in which all four fingers are placed together on the platen, and then, while in a fixed position on the platen are read together as a single unit by the reading apparatus. The apparatus and operation described to this point reads such a "slap print".

Figure 5:
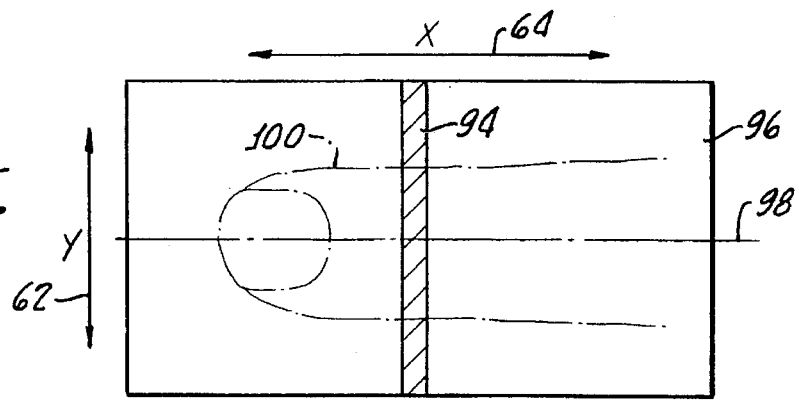
FIG. 5 illustrates the relative orientation of a linear array camera for detecting finger position and an image of a single finger.

Fingerprints are also provided as prints of individual fingers, often termed "roll prints" because these prints are taken of a single finger at a time, with the finger caused to roll across the platen surface about the longitudinal axis of the finger. As the single finger is rolled across the platen, at any instant there is a relatively narrow line of contact, extending longitudinally of the finger, between the finger and the platen. This line of contact moves across the platen (in Y direction) as the finger rolls. For reading out a roll print, it is desired to align the image of this line of contact of the finger with the longitudinal extent of the print camera CCD array 70 (FIG. 3). Thus, if the longitudinal extent (in X) of the finger during its rolling motion across the platen is at a given Y position, the scanning mirror position is controlled so that the particular portion of the image that contains the line of contact of the finger with the platen (at such Y position) is effectively aligned with the line of the CCD 70 of the print camera. To this end an estimate of the Y position of the line of contact of the finger during a rolling print operation is obtained by reflecting part of the image beam from beam splitter 46 and lens 80 to the second beam splitter 82, from which it is reflected through a lens 90 to a roll camera 92. Roll camera 92 includes a second fixedly positioned linear array CCD sensor indicated at 94. As illustrated in FIG. 5, the second linear CCD array 94 is oriented across the image 96 in the Y direction. That is, the array 94 of the roll camera is oriented in the scan direction and transverse to the longitudinal axis 98 of a finger 100 of which a roll print is being made. X direction arrow 64 and Y direction arrow 62 are also shown in FIG. 5 to indicate orientation of the finger image and line CCD 94 at the roll camera 92.

Figure 4:
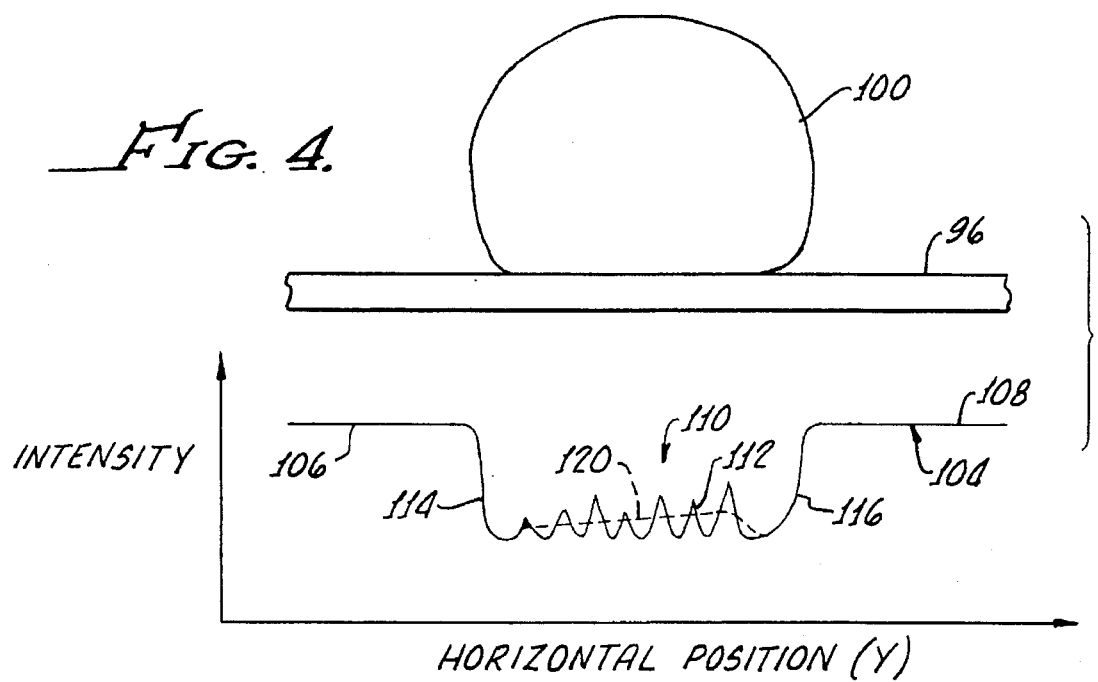
FIG. 4 illustrates a signal obtained from a linear array camera used to detect position of a rolling finger.

At each Y position of the finger 100 in its roll scan there is obtained an optical signal that is input to the roll camera. This optical signal for one typical instantaneous position of the moving finger has the general form of a curve 104 shown in FIG. 4. Signal 104 varies in the Y direction, e.g., transverse to the length of the finger. The optical signal into the roll camera includes high intensity lateral portions 106,108 representing the total internal reflection at the glass/air interface, e.g., where the finger does not contact the platen. A central portion of this optical signal, indicated at 110, effectively provides a low intensity light area having a number of small variations 112 indicating print ridges. The depressed or low intensity light area 110 effectively extends between points 114 and 116 of this optical signal. For purposes of controlling scan mirror position, it is desired to estimate only the location of the center of the depressed area 110 between points 114 and 116. Details of variation of the signal between these two points are of no interest for this estimate. Accordingly, the optical signal is effectively filtered, as by defocusing the optical signal on the line camera 94, to provide a signal that is generally indicated by the dotted line 120 in FIG. 5. This signal represents the voltage level of charges in those of the several CCD sensors of the linear roll camera that are at the image of the finger position at a given time during the finger rolling motion.

The roll camera provides an output from the linear array CCD to a smoothing and processing circuit 122 (FIG. 2) that yields on an output line 124 an electrical position estimate signal having a magnitude that represents the Y position of the longitudinal axis of the finger, such as finger axis 98 of FIG. 5, during the course of its rolling across the prism platen. This position estimate signal is fed via line 124 as a position control input to the scan mirror actuator and control circuit 52 to thereby control the angular position of the scan mirror. Accordingly, the mirror is moved about its axis to an orientation that directs the image of platen 20 (including a finger pressed thereagainst during a roll print operation) so that the image of the line of contact of this finger during its rolling action is always aligned with the linear array 70 of the print camera 60.

Figure 6A:
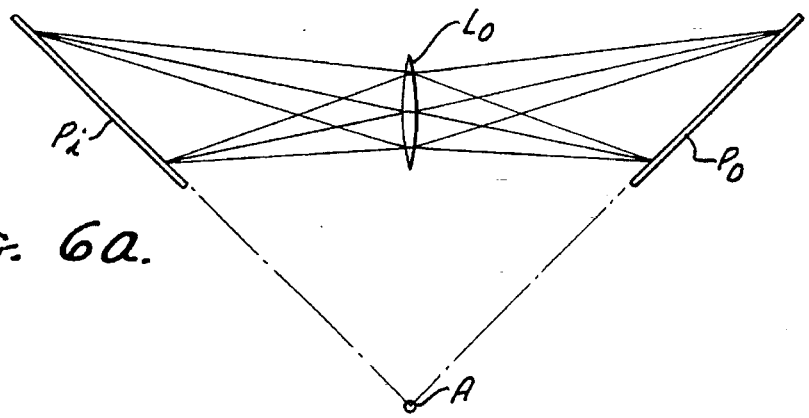
FIGS. 6a and 6b illustrate certain imaging conditions for imaging a tilted object plane.
Figure 6B:
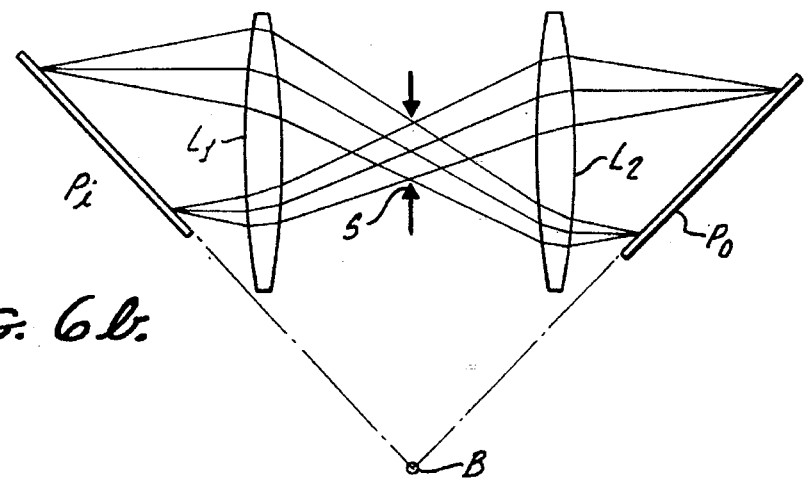

A significant feature of the described system is the fact that the print scan path, from the prism platen to the print camera 60, produces an image on the linear CCD array of the print camera that is free of keystone distortions. It is free of distortion in both the scan and cross scan image direction. In this system, the object plane (the platen surface) is inclined at 65° (with a 65° prism) to the optical axis. Inclination of the object plane requires that the image plane be tilted so that its projection intercepts the crossing of the projected object plane with the lens principal plane in order to keep the image in sharp focus. This is an imaging condition known as the "Scheimpflug" imaging condition. The Scheimpflug imaging condition is illustrated schematically in FIG. 6a for a 1:1 afocal relay employing a lens $L_o$ for providing an image on an oblique image plane $P_i$ of an object on an oblique object plane $P_o$. Projections (extensions) of the image and object plane intercept each other and the lens principal plane at a common point (actually a line) A. Use of the same set up with an afocal 1:1 relay is shown in FIG. 6b with tilted image and object planes $P_{i1}$ and $P_o$, lenses $L_1$ and $L_2$, and a common pupil or aperture stop S between them. As can be seen in FIG. 6a, object surface $P_o$, image surface $P_i$, and the principle plane (of common aperture stop S) all intersect at a common line shown as point B. To obtain the Scheimpflug condition the image plane, namely the plane of the print camera 60, is also tilted relative to the optical axis. The system described above and shown in FIGS. 1–5 is basically analogous to the arrangement shown in FIG. 6b, where lens $L_1$ corresponds to the focus lens 56, lens $L_2$ to the scan lens 40, object plan $P_o$ to platen 20, image plane $P_i$ to the surface of print camera 60, and pupil S to scan mirror 48, with the plane of the pupil S intersecting at a common point (plane) with the planes of the image and object surfaces.

The tilt of the image plane in an exemplary system is 65°, where the object plane is also tilted at 65 degrees. The tilt of both object plane and image plane in the drawing of FIG. 2 (analogous to the arrangement of FIG. 6b) is at an angle to the plane of the paper, tilting about an axis extending from the top to bottom of the paper. The tilt axis lies in a plane parallel to the plane of the paper and perpendicular to the optical axis.

The Scheimpflug imaging condition obtains sharp focus of a tilted object plane, but leaves a keystone distortion, which is actually a non-uniform magnification in scan and cross scan planes. In other words, the usual Scheimpflug arrangement with a tilted object plane causes image magnification to vary from top to bottom of the image and also from left to right so that, for example, a square object is imaged as a trapezoid. This undesirable condition is avoided in the present system by establishing a concurrent condition of telecentricity in both object and image space. This dual telecentricity condition maintains the magnification uniform and unvarying in both scan and cross scan directions to avoid keystone distortion.

In the past, Scheimpflug imaging condition has been utilized with unity magnification in order to obtain fixed image scale (e.g., scale that does not vary across the image format). Nevertheless, even though the magnification is uniform in both directions across the image, the magnification in the embodiment of the invention described above is not unity, but it is anamorphic, that is, it is different in scan and cross scan directions. In the embodiment described herein unity magnification is not used. Yet a focused image of an object in a tilted plane is achieved in the present system with constant magnification across the image in two orthogonal directions (scan and cross-scan directions). In addition, by control of scan mirror scan rate anamorphic magnification is avoided, without need for unity magnification, and the arrangement provides magnification that is effectively equal in both directions. In the system described herein, use of the linear print camera and scanning mirror avoids the need for unity magnification because it allows the magnification to be made equal in two orthogonal directions by adjusting scan rate. Thus, the system produces an output from the print camera that defines an image that is precisely, accurately, and equally scaled in both dimensions. The camera output defines an image in terms of pixels that are precisely spaced at selected distances, such as five hundred per inch, both vertically and horizontally, as required by established fingerprint imaging criteria. This is accomplished in part by control of mirror scan rate, as will be more particularly described below. In the scan direction of the described system magnification is 0.53, whereas in the cross scan direction the magnification is one-half of that or 0.265.

Where the entrance pupil of the lens is at the focal point of the lens, the exit pupil is at infinity and exiting rays are parallel. This is known as a telecentric condition. In the present system the scan mirror 48 is a common pupil for both the focus lens and the scan lens. The scan mirror 48 is an exit pupil for the scan lens 40, being positioned at a distance from the scan lens equal to its focal length (about 280 millimeters in the embodiment described herein). The mirror is also an entrance pupil for the focus lens 56, being positioned at a distance from the focus lens equal to the focal length (about 140 millimeters in the embodiment described herein) of this lens. Moreover, in an exemplary system the distance between the object (the platen) and the scan lens is also equal or substantially equal to the focal length of this lens, and the distance between the focus lens 56 and the image plane at camera 60 is equal to the focal length of the focus lens. This optical architecture provides for a dual telecentricity, that is, a telecentricity for both object and image space and results in constant (but different) magnification in both scan and cross scan directions. In other words, it eliminates keystone distortion. Significantly, this dual telecentricity condition is achieved where the magnification is not unity. As stated above, in this exemplary system magnification is 0.53 and 0.265 in scan and cross scan directions, respectively. Yet, the dual telecentricity condition is still achieved. The different magnifications in different directions are effectively made equal by control of mirror scan speed.

Specifications of the Federal Bureau of Investigation set forth certain goals that are desirably met by fingerprint systems including fingerprint readers. Among these specifications is a requirement that the fingerprint must appear at the image plane free of distortion. Another requirement, as mentioned above, is that the pixels of a digitized image represent elements of the fingerprint object that are spaced at distances of 1/500ths of an inch in both X and Y directions. Utilizing an object plane, the platen in the system described herein, that is 2 inches in cross scan dimension and 3¼ inches in scan dimension, magnification of 0.265 in the cross scan dimension is employed to enable utilization of a linear CCD array in the print camera, having a dimension of about one inch. Moreover, each individual cell in the linear array of the print camera is spaced from an adjoining cell so that center to center spacing of the individual cells of the CCD print camera array multiplied by the magnification factor in the cross scan or X direction is this desired 1/500 factor. Accordingly, based on the actual cell to cell spacing of sensors in a the array CCD used in the print camera, the magnification of 0.265 is established to obtain this 1/500 spacing. This parameter of the system, namely the magnification in the cross scan direction, therefore is fixed and determined by the spacing of the individual sensor elements of the CCD array.

Effective magnification in the scan direction, that is the Y direction, because of the anamorphic magnification resulting from the Scheimpflug condition is 0.53, is made equal to the cross scan magnification of 0.265 by controlling the scanning rate of the mirror 48. The arrangement provides a scan rate that enables a single scan in the Y direction across the prism to be completed in about one second. The Y or scan direction magnification is made effectively equal to the cross scan magnification by increasing the scan rate. This is done empirically by adjusting scan rate until an image of proportions equal to proportions of the object is obtained. For this empirical adjustment an object of known geometry is placed in the object plane and the scan rate is adjusted until the image (as provided from the output of the print camera CCD's) has the same geometry as the object.

In a presently preferred method of carrying out the invention, the entire line of sensor cells of the CCD array of the print camera is sampled together at repetitive intervals of a fixed sample rate. For a given fixed sample rate the mirror scan rate is adjusted so that one sample of a complete line of sensors of the print camera is obtained for each 1/500ths of an inch of movement of the scanning mirror across the object platen. Accordingly, as the image is scanned across the print camera linear CCD array, one sample is taken for each 1/500ths of an inch across the prism platen 20.

Because the scanning operation employs the scanning mirror 48 to scan the image across the linear print camera array CCD sensor, it is important that the angle of entry of light from the object into the lens system be proportional to the lateral displacement of the image from the optical axis. This is a condition commonly met with small lenses. However, in the present system the scan lens 40 may be as large as four inches in diameter, and thus a linear relation between entry angle and lateral displacement of the image could be greatly degraded at larger entry angles. For this reason the scan lens 40 is an F-Theta lens. As is well known, an F-Theta lens, for larger entry angles, produces a scan displacement in the horizontal direction that is a precisely linear function of the angle of entry of light from the object lens, which in turn, in the described system, is a linear function of the rotation angle of the scan mirror. This type of lens is well known but is not known previously to have been incorporated in a telecentric architecture.

It will be seen that the system and method described herein provide for dual telecentricity, that is, telecentricity in both image and object space in a system that employs non-unity magnification. The system meets the Scheimpflug condition, wherein an image of an object on a tilted object plane is focused on the image plane, and, in addition, keystoning distortion is eliminated and anamorphic magnification is compensated by control of scan rate.

What is claimed is:

1. A fingerprint reader comprising:
   an imaging system for generating an optical beam defining an optical image of a fingerprint;

a scanning mirror;

an array of sensors;

an optical system for directing said optical image at said scanning mirror for reflection to said array of sensors, said optical system having dual telecentricity and non-unity magnification; and a mirror controller for scanning said mirror about a scan axis to scan said optical image across said array of sensors.

2. The fingerprint reader of claim 1 wherein said optical image is scanned in a scan direction, wherein said optical system has a first magnification in a cross-scan direction perpendicular to said scan direction, and including means for making the magnification of said system in said scan direction effectively equal to said first magnification.

3. A fingerprint reader comprising:

an imaging system for generating an optical beam defining an optical image of a fingerprint;

a scan mirror;

a linear array of sensors;

an optical system for directing said optical image at said scan mirror for reflection to said linear array of sensors; and a mirror controller for scanning said mirror about a scan axis to scan said optical image across said linear array of sensors, said optical system comprising a scan lens interposed between said imaging system and said scan mirror and a focus lens interposed between said linear array of sensors and said scan mirror, and wherein said optical system including said scan lens and said focus lens is telecentric in both object space and image space.

4. The fingerprint reader of claim 3 wherein said scan lens comprises a F-Theta lens in which lateral displacement of the image from the optical axis is proportional to the angle of entry of light to the lens over a relatively large entry angle.

5. A fingerprint reader comprising:

an imaging system for generating an optical beam defining an optical image of a fingerprint;

a scan mirror;

a linear array of sensors;

an optical system for directing said optical image at said scan mirror for reflection to said linear array of sensors; and a mirror controller for scanning said mirror about a scan axis to scan said optical image across said linear array of sensors, said optical system comprising a scan lens and a focus lens having a common focal point between them, and wherein said scan mirror is interposed between said lenses at said common focal point.

6. A fingerprint reader comprising:

an imaging system for generating an optical beam defining an optical image of a fingerprint;

a scanning mirror;

a linear array of sensors;

an optical system for directing said optical image at said scanning mirror for reflection to said linear array of sensors; and a mirror controller for scanning said mirror about a scan axis to scan said optical image across said linear array of sensors, said scanning mirror being mounted for angular movement through a plurality of positions, said imaging system including a platen over which a finger is to be moved, means for generating a finger position signal indicative of position of a finger on said platen, and means for controlling the angular position of said scan mirror in response to said finger position signal.

7. The reader of claim 6 wherein said means for generating a finger position signal comprises a linear array of roll print sensors, means for directing a portion of said optical beam to said linear array of roll print sensors, said linear array of roll print sensors extending in a direction parallel to the extent of a finger on said image plane.

8. A fingerprint reader comprising:

an imaging system for generating an optical beam defining an optical image of a fingerprint;

a scanning mirror;

a linear array of sensors;

an optical system for directing said optical image at said scanning mirror for reflection to said linear array of sensors; and a mirror controller for scanning said mirror about a scan axis to scan said optical image across said linear array of sensors, said optical image being scanned in a scan direction, said optical system having a first magnification in a cross scan direction perpendicular to said scan direction, and said mirror having a scanning speed controlled to provide an effective magnification in a cross scan direction that is the same as said first magnification.

9. A fingerprint reader comprising:

an imaging system for generating an optical beam defining an optical image of a fingerprint;

a scanning mirror;

a linear array of sensors;

an optical system for directing said optical image at said scanning mirror for reflection to said linear array of sensors;

a mirror controller for scanning said mirror about a scan axis to scan said optical image across said linear array of sensors, and means for driving said scanning mirror at a scan rate, said optical system having an anamorphic magnification, and including means for controlling the scan rate of said scanning mirror to compensate for said anamorphic magnification and to make the effective magnification of said fingerprint reader equal in two mutually orthogonal directions.

10. A fingerprint reader comprising:

an imaging system for generating an optical beam defining an optical image of a fingerprint;

a scanning mirror;

a linear array of sensors;

an optical system for directing said optical image at said scanning mirror for reflection to said linear array of sensors;

a mirror controller for scanning said mirror about a scan axis to scan said optical image across said linear array of sensors, said optical system including an object plane and an image plane tilted relative to an optical axis of said optical system, said optical system having dual telecentricity and anamorphic magnification, and means for making the magnification of said optical system effectively equal in two orthogonal directions.

11. The fingerprint reader of claim 10 wherein said optical system includes a scan lens and a focus lens having a common focal point, and wherein said means for avoiding distortion comprises said scanning mirror and said lenses, said scanning mirror forming a pupil for both said scan and focus lenses and being positioned at said common focal point.

12. The fingerprint reader of claim 11 including means for driving said mirror at a controlled scan rate, and wherein said means for making the magnification of said optical system effectively equal comprises means for controlling the scan rate of said scanning mirror.

13. The fingerprint reader of claim 12 wherein said optical image is scanned in a scan direction, wherein said optical system has a first magnification in a cross scan direction perpendicular to said scan direction, and wherein said mirror has a scanning speed controlled to provide an effective magnification in a cross scan direction that is the same as said first magnification.

14. A fingerprint reader comprising:
  a prism having a platen adapted to receive a finger of which a print is to be read;
  an illumination system for illuminating the prism to reflect from the prism an optical beam representing an optical image of the fingerprint;
  a first print scan optical path for producing an image of the platen;
  a second live view monitor optical path for providing a visually displayed image of the platen; and
  a third position tracking optical path for generating a position signal representing position of a finger in a first direction along said platen;
  said print scan optical path including:
    a linear array of sensors;
    a scan mirror configured and arranged to reflect an image of said platen and to scan said image across said array of sensors in a scan direction; and
    means responsive to said finger position signal for controlling angular position of said scan mirror.

15. The reader of claim 14 wherein said third position tracking optical path includes a second linear array of sensors, and means for directing an image of said platen to said second linear array of sensors, said second linear array of sensors being oriented relative to said image in a direction normal to said scan direction.

16. The reader of claim 14 wherein said print scan path includes an optical system that provides a first magnification in said scan direction and a second magnification in a cross scan direction that is normal to said scan direction, said first and second magnification being mutually different, said scan mirror being adjusted to scan at a rate that provides an effective magnification of said image in said scan direction that is equal to the magnification of said image in said cross scan direction.

17. The reader of claim 16 wherein said print scan path includes a scan lens positioned between said prism and said scan mirror and a focus lens positioned between said linear array of sensors and said scan mirror, said focus and scan lenses having a common focal point therebetween, said scan mirror being positioned at said common focal point.

18. The reader of claim 17 wherein said prism has a totally internally reflecting platen surface that is tilted with respect to the optical axis of said scan lens, said linear array of print camera sensors being tilted with respect to the optical axis of said focus lens, said print scan optical path providing an anamorphic magnification of said image at said linear array of sensors, means for scanning said mirror at a selected scan rate, and means for adjusting said scan rate of said mirror to substantially equalize magnification of said image in different directions.

19. A method of reading a fingerprint comprising the steps of:
  forming an optical image of a fingerprint;
  optically directing said optical image to a linear array of print camera sensors extending in a cross scan direction; and
  scanning said image across said linear array of print camera sensors in a scan direction transverse to said cross scan direction, said step of forming an optical image comprising providing an object platen configured and arranged to receive a finger that rolls across the platen in a first direction, and including the steps of generating a signal representing position of said finger on said platen in said first direction, and controlling the position of said image in said scan direction relative to said linear array of print camera sensors in response to said position signal.

20. A method of reading a fingerprint comprising the steps of:
  forming an optical image of a fingerprint;
  optically directing said optical image to a linear array of print camera sensors extending in a cross scan direction; and
  scanning said image across said linear array of print camera sensors in a scan direction transverse to said cross scan direction, said step of optically directing said optical image to a linear array of print camera sensors comprising the steps of magnifying the image at said linear array of print camera sensors with a first magnification in said scan direction and a second magnification in said cross scan direction, and including the steps of adjusting the scanning rate of the image across said linear array of print camera sensors by an amount that decreases the difference between said first and second magnifications.

21. A fingerprint reader comprising:
  an object plane for receiving a finger of which a print is to be imaged;
  an image plane; and
  an optical system interposed between said object and image planes for forming on the image plane an image of a finger positioned at said object plane, said optical system having dual telecentricity and a non-unity magnification.

22. The fingerprint reader of claim 21 wherein said dual telecentricity and non-unity magnification of said optical system introduces magnification that is different in each of two mutually orthogonal directions, and including means for making the magnification of the image at said image plane effectively equal in both said directions.

23. The fingerprint reader of claim 21 wherein said optical system includes a scan lens, a focus lens, and a scanning mirror positioned at a common focal point between said scan and focus lenses.

24. The fingerprint reader of claim 21 including an array of sensors defining said image plane, and wherein said optical system includes a scanning mirror for directing an image of a finger at said object plane on said sensor array.

25. A fingerprint reader comprising:
- a prism having a platen adapted to receive a finger of which a print is to be read;
- an illumination system for illuminating the prism to reflect from the prism an optical beam representing an optical image of the fingerprint;
- a first print scan optical path for producing an image of the platen;
- a second position tracking optical path for generating a position signal representing position of a finger in a first direction along said platen, said print scan optical path including:
- an array of sensors;
- a scan mirror configured and arranged to reflect an image of said platen and to scan said image across said array of sensors in a scan direction; and
- means responsive to said finger position signal for controlling angular position of said scan mirror.

* * * * *